United States Patent
Mais et al.

(10) Patent No.: US 9,618,373 B2
(45) Date of Patent: Apr. 11, 2017

(54) DEVICE FOR DETECTING AT LEAST ONE PROPERTY OF A FLUID MEDIUM

(75) Inventors: Torsten Mais, Ludwigsburg (DE); Ulrich Wagner, Munich (DE)

(73) Assignee: ROBERT BOSCH GMBH, Stuttgart (DE)

(*) Notice: Subject to any disclaimer, the term of this patent is extended or adjusted under 35 U.S.C. 154(b) by 86 days.

(21) Appl. No.: 14/004,652

(22) PCT Filed: Jan. 16, 2012

(86) PCT No.: PCT/EP2012/050561
§ 371 (c)(1),
(2), (4) Date: Nov. 15, 2013

(87) PCT Pub. No.: WO2012/126643
PCT Pub. Date: Sep. 27, 2012

(65) Prior Publication Data
US 2014/0060176 A1    Mar. 6, 2014

(30) Foreign Application Priority Data
Mar. 18, 2011    (DE) .................. 10 2011 005 768

(51) Int. Cl.
*G01F 1/684*    (2006.01)
*G01F 15/14*    (2006.01)

(52) U.S. Cl.
CPC ............ *G01F 1/684* (2013.01); *G01F 1/6842* (2013.01); *G01F 15/14* (2013.01)

(58) Field of Classification Search
CPC ......... G01F 1/6842; G01F 1/684; G01F 15/14
See application file for complete search history.

(56) References Cited

U.S. PATENT DOCUMENTS

| | | | | |
|---|---|---|---|---|
| 4,914,947 A | * | 4/1990 | Davidson | G01F 5/00 73/202.5 |
| 6,557,408 B1 | * | 5/2003 | Mueller | G01F 5/00 73/202.5 |

(Continued)

FOREIGN PATENT DOCUMENTS

| | | |
|---|---|---|
| DE | 103 47 912 | 4/2004 |
| DE | 10 2007 024 865 | 12/2008 |

(Continued)

OTHER PUBLICATIONS

International Search Report for PCT/EP2012/050561, dated May 3, 2012.

(Continued)

*Primary Examiner* — Lisa Caputo
*Assistant Examiner* — Tran M Tran
(74) *Attorney, Agent, or Firm* — Gerard Messina (57) ABSTRACT

A device for detecting at least one property of a fluid medium has at least one sensor housing introducible into the fluid medium, which sensor housing has at least one channel through which the fluid medium flows and which has at least one outlet opening. The fluid medium flows out through the outlet opening after flowing through the channel. The sensor housing has at least one housing body and at least one cover. The outlet opening is situated in the cover. The housing body has at least one collar section, which engages with the outlet opening and which forms at least one part of an edge of the outlet opening.

10 Claims, 5 Drawing Sheets

(56) References Cited

U.S. PATENT DOCUMENTS

| | | | | |
|---|---|---|---|---|
| 6,640,627 | B2* | 11/2003 | Sato | G01F 1/684 |
| | | | | 73/204.22 |
| 6,708,561 | B2* | 3/2004 | Zurek | G01F 1/6842 |
| | | | | 73/202.5 |
| 6,820,479 | B2* | 11/2004 | Roeckel | G01F 1/6842 |
| | | | | 374/E13.006 |
| 6,845,661 | B2* | 1/2005 | Bogdanov | G01F 1/6842 |
| | | | | 73/204.22 |
| 6,851,309 | B2* | 2/2005 | Lenzing et al. | 73/204.22 |
| 6,851,311 | B2* | 2/2005 | Nakada | F02D 41/187 |
| | | | | 73/202.5 |
| 6,915,682 | B2* | 7/2005 | Renninger | G01F 15/12 |
| | | | | 73/114.34 |
| 7,032,446 | B2* | 4/2006 | Nakada | G01F 1/684 |
| | | | | 73/202.5 |
| 7,051,589 | B2* | 5/2006 | Igarashi | G01F 1/72 |
| | | | | 73/202.5 |
| 7,284,423 | B2* | 10/2007 | Kuzuyama | G01F 5/00 |
| | | | | 73/202 |
| 7,305,877 | B2* | 12/2007 | Beyrich | G01F 1/6842 |
| | | | | 73/202.5 |
| 7,360,414 | B2* | 4/2008 | Konzelmann | G01F 1/6842 |
| | | | | 73/202.5 |
| 7,523,659 | B2* | 4/2009 | Okamoto | G01F 1/6842 |
| | | | | 73/202.5 |
| 7,665,351 | B2* | 2/2010 | Kamiya | G01F 1/684 |
| | | | | 73/114.32 |
| 7,765,865 | B2* | 8/2010 | Ike | G01F 1/6845 |
| | | | | 73/204.22 |
| 8,205,493 | B2* | 6/2012 | Mais | G01F 1/6842 |
| | | | | 73/202.5 |
| 8,418,548 | B2* | 4/2013 | Konzelmann | G01F 1/6842 |
| | | | | 73/114.32 |
| 8,448,508 | B2* | 5/2013 | Schneider | 73/204.26 |
| 8,590,368 | B2* | 11/2013 | Kitahara | G01F 1/6842 |
| | | | | 73/114.32 |
| 8,607,624 | B2* | 12/2013 | Renninger | G01F 1/6842 |
| | | | | 73/114.32 |
| 8,714,000 | B2* | 5/2014 | Sudou | G01M 15/042 |
| | | | | 73/114.32 |
| 8,733,166 | B2* | 5/2014 | Ooga | G01F 1/6842 |
| | | | | 73/204.25 |
| 8,813,556 | B2* | 8/2014 | Matsumoto | G01F 1/6842 |
| | | | | 73/204.11 |
| 9,163,964 | B2* | 10/2015 | Schneider | G01F 1/00 |
| 2006/0137444 | A1 | 6/2006 | Kuzuyama | |
| 2009/0282909 | A1 | 11/2009 | Wienand | |

FOREIGN PATENT DOCUMENTS

| | | |
|---|---|---|
| DE | 10 2008 042 164 | 3/2010 |
| DE | 10 2008 042 807 | 4/2010 |
| EP | 1 291 622 | 3/2003 |
| EP | 1 855 090 | 11/2007 |
| JP | S6090623 | 6/1985 |
| JP | 2004132351 | 4/2004 |
| JP | 2006153734 | 6/2006 |
| JP | 2006234766 | 9/2006 |
| JP | 2007298481 | 11/2007 |
| JP | 2009541757 | 11/2009 |

OTHER PUBLICATIONS

Robert Bosch GmbH: Sensoren im Kraftfahrzeug [*Sensors in the motor vehicle*], edition 2007, pp. 140-142.

* cited by examiner

FIG. 5

DEVICE FOR DETECTING AT LEAST ONE PROPERTY OF A FLUID MEDIUM

CROSS-REFERENCE TO RELATE AN APPLICATION

The present application is a national phase of the International Patent Application PCT/EP2012/050561, filed Jan. 16, 2012, and claimed priority to the German Patent Application DE 10 2011 005 768.4, filed on Mar. 18, 2011.

BACKGROUND OF THE INVENTION

1. Field of the Invention

The present invention is directed to devices for detecting at least one property of a fluid medium, e.g., a fluid medium flowing through a flow tube in a main flow direction. The fluid medium may basically be gases and/or liquids, in particular air, for example intake air in an intake manifold of an internal combustion engine of a motor vehicle. However, other fields of use are also conceivable. The at least one property to be determined may basically be any physical and/or chemical parameter of the fluid medium. In particular, the property may be a flow property, e.g., a flow velocity and/or a mass flow rate and/or a volume flow rate.

2. Description of the Related Art

The detection device is described with reference to an air flow rate measurement, e.g., in the intake manifold of an internal combustion engine. Numerous air flow meters are known from the related art, for example from Robert Bosch GmbH: Sensoren im Kraftfahrzeug [*Sensors in the motor vehicle*], edition 2007, pp 140-142. Other examples of such air flow meters are known from German patent application documents DE 10 2008 042 164 A1, DE 10 2007 024 865 A1 and DE 10 2008 042 807. In particular, these devices may be so-called hot-film air flow meters which as a rule are designed as plug-in sensors and which include at least one channel through which a portion of the flowing fluid medium is guided. For example, the plug-in sensor may be introduced into a flow tube, and a portion of the flowing fluid medium is guided through a channel of the plug-in sensor. In the channel, a sensor element, e.g., a hot-film air flow meter chip, is usually situated which includes at least one heating element and at least two temperature sensors situated upstream and downstream from the heating element. A mass flow rate of the fluid medium, e.g., of the intake air, may be inferred from an asymmetry of the temperature distribution.

In many hot-film air flow meters of the type described, the channel ends in an outlet opening. This outlet opening is in many cases formed within a removable cover of a housing of the plug-in sensor, e.g., on a side wall of the plug-in sensor and/or on a front side of the plug-in sensor. Due to the installation tolerances and/or the manufacturing tolerances, the design and/or the positioning of the cover in the area of this outlet opening may, however, change, so that the geometry of the outlet opening may be subjected to variations. Thus, overhangs of the cover over the opening may form, for example, which may result in additional eddies and a pressure drop in the area of the outlet opening. These, in turn, may influence a flow through the channel and thus have an effect on the measurement accuracy of the hot-film air flow meter. A device of the above-mentioned type would thus be desirable which is manufacturable in a simple and cost-effective manner with high precision and reduced tolerance in the area of the outlet opening.

BRIEF SUMMARY OF THE INVENTION

Accordingly, a device for detecting at least one property of a fluid medium, in particular of a fluid medium flowing through a flow tube in a main flow direction, is proposed which avoids at least some of the above-mentioned disadvantages of known devices of the above-mentioned type. The device may basically be designed similarly to the above-described devices, so that the fluid medium may be, for example, one or multiple gases and/or liquids, in particular air, e.g., intake air mass of an internal combustion engine. The properties of the flowing fluid medium, which are qualitatively and/or quantitatively detectable, may, in particular, be one or multiple flow properties, e.g., a velocity, a volume flow rate and/or a mass flow rate. In particular, the device may thus be designed as an air flow meter, in particular as a hot-film air flow meter, preferably for use in the intake manifold of an internal combustion engine. Other embodiments are also possible in principle.

In particular, the device may include at least one sensor element. A sensor element is understood here as an element which is configured to qualitatively and/or quantitatively detect the at least one detectable property and, for example, to convert it into appropriate measuring signals, in particular electrical and/or visual signals. In particular, this sensor element may include at least one sensor chip, e.g., a hot-film air flow meter sensor chip, which may make contact with the flowing fluid medium. For example, the sensor element may include at least one sensor chip having a measuring surface, on the measuring surface it being possible for at least one heating element, e.g., at least one heat resistor, and at least two temperature sensors, e.g., at least two temperature measuring shunts, to be situated. As described above, a mass flow rate and/or a volume flow rate and/or a velocity of the fluid medium may be inferred from an asymmetry of a temperature distribution and/or of the measuring signals of the temperature sensors. Alternatively or additionally, the sensor element may, however, also include one or multiple other types of sensor elements, e.g., temperature sensors and/or pressure sensors, and/or other types of sensor elements which may be known in principle from the related art. The sensor element may, in particular, be accommodated in the device in such a way that it is in direct or indirect contact with the fluid medium.

The sensor device has at least one sensor housing which is introducible into the fluid medium. The sensor housing has at least one channel through which the fluid medium may flow.

As will be explained in greater detail below, the sensor housing may, for example, be designed entirely or partially as a plug-in sensor and/or be an integral part of a plug-in sensor. Thus, the device may, for example, include a flow tube and/or be inoperative connection with a flow tube through which the fluid medium may flow and into which the plug-in sensor may protrude, so that the plug-in sensor protrudes into the flow cross section of the flow tube. The at least one channel, through which a portion of the fluid medium may flow, may be accommodated in the plug-in sensor, for example, as is the case in known hot-film air flow meters. For example, the plug-in sensor may include an inlet opening, through which a portion of the fluid medium may be guided from the flow tube into the channel, and at least one outlet opening through which a flow out of the channel is possible. The channel may have a straight or also a branched design and it may, for example, include at least one main channel, through which a main portion of the fluid medium flows, as well as optionally at least one bypass channel, through which a volume fraction of the fluid medium, which is branched off of the main channel, may flow. The sensor element may be situated in at least one channel, in particular in the bypass channel, for example, in that the fluid medium flows over the measuring surface of the sensor element, e.g., the sensor chip. In this respect, reference may be made in principle to the above-mentioned related art.

As described above, the sensor housing has the at least one channel through which the fluid medium may flow. The channel has at least one outlet opening, the fluid medium flowing through the outlet opening, for example back into the flow tube, after flowing through the channel. The sensor housing itself has at least one housing body and at least one cover. For example, the channel or at least one part of the channel may be formed in the housing body, whereas the cover may, for example, close an inner space of the housing body and/or the channel to an outer space outside of the sensor housing, for example, against the fluid medium outside of the sensor housing in the flow tube. The outlet opening is situated in the cover.

To resolve the above-described problem, it is proposed that the housing body has at least one collar section engaging with the outlet opening. The collar section forms at least one part of an edge of the outlet opening. The housing body may thus engage with the cover and, for example, form an edge at least on sections of the outlet opening. In this way, a cover may be provided having the outlet opening, the edge of the outlet opening, however, being completely or partially formed by the housing body and its collar section. The problem described above, that due to manufacturing tolerances and/or installation tolerances, tolerances occur in a design of a geometry of the outlet opening in the cover, may thus be avoided or at least reduced in this way, since now tolerances in the design of the cover and/or in an installation of the cover in relation to the housing body can no longer influence or influence only insignificantly the design of the geometry of the edge of the outlet opening, since the edge of the outlet opening may now be formed at least partially from the collar section of the housing body.

Here, a housing body and a cover are understood within the scope of the present invention as at least two components of the sensor housing which are operatively linked and which, for example, may be in direct contact with one another, preferably in a form-locked and/or force-fitted contact, an integral connection also being possible, however. The housing body and the cover may each have a one-piece or also a multi-part design. Here, a cover is in general understood as a component of the sensor housing which forms a surface, which faces the fluid medium outside of the sensor housing, around the outlet opening. In contrast, the housing body is an element which is situated in the area of the outlet opening on the side of the sensor housing opposite this surface. The at least one channel may, for example, be entirely or partially situated in the housing body and/or entirely or partially in the cover. It is, however, particularly preferred when housing body and cover are operatively linked to form this at least one channel. Thus, at least one elongated indentation may, for example, be provided in the housing body and/or in the cover which forms a channel after the housing body and the cover have been assembled. The housing body and/or the cover may, for example, be manufactured entirely or partially from a plastic material, alternatively or additionally, however, the use of other materials, e.g., of ceramic and/or metallic materials, also being possible. The housing body and the cover may, for example, be integral parts of a plug-in sensor, as described above.

The outlet opening may basically have any type of cross section, e.g., a round, oval, polygonal, or also slit-shaped cross section. The outlet opening may preferably be situated on a side surface of the plug-in sensor which is situated in the flow tube in such is a way that it is preferably aligned essentially in parallel to a main flow direction, i.e., preferably having a deviation of no more than 20°, in particular of no more than 10°, and particularly preferably of no more than 5° from a parallel alignment to the main flow direction.

The collar section may form the edge of the outlet opening entirely or also only a portion of this edge. In particular, this collar section may be situated on a downstream side of the outlet opening with regard to a main flow direction of the fluid medium in the flow tube.

Other possible embodiments relate to the channel of the device. This channel may have a one-piece or also a multi-part design. In particular, at least one sensor element for detecting the at least one parameter may be accommodated in the channel. This sensor element may, in particular, be a hot-film air flow meter sensor element, e.g., a hot-film air flow meter sensor chip according to the description above. Additionally or alternatively, other embodiments are also possible, however.

The channel may, in particular, have at least one main channel and at least one bypass channel branching off of the main channel. The sensor element may, in particular, be situated in the optional at least one bypass channel. For example, the main channel may extend from a front-side upstream inlet opening to the outlet opening. The bypass channel may branch off of the main channel and end in one or multiple bypass channel outlet opening(s) which may, for example, also be situated on a side surface of the plug-in sensor and/or on a head side which protrudes farthest into the flowing fluid medium. Other embodiments are also possible, however.

As described above, the sensor housing may, in particular, be at least partially designed as a plug-in sensor, the plug-in sensor being introducible into the flow tube of the fluid medium. This introduction of the plug-in sensor into the flow tube may take place as part of a fixed installation or also replaceably. The flow tube itself may also be an integral part of the proposed device, but it may also be designed independently of the device. In particular, the flow tube may be an intake manifold for an intake air mass of an internal combustion engine.

The cover may, in particular, have an outer side facing the fluid medium, as described above. This outer side may, for example, face the fluid medium outside of the sensor housing, in particular in the flow tube, and the fluid medium may, for example, flow around it in the flow tube. At the outlet opening, the channel, e.g., the main channel, may have a ramp running obliquely to the outer side. For example, this ramp may be designed in such a way that the fluid medium flowing out through the outlet opening merges at an acute angle with the fluid medium flowing outside of the sensor housing in the main flow direction. The edge of the outlet opening may, in particular, form at least a part of this ramp. In particular, the ramp may end in the outer side at an angle of 10° to 80°, preferably at an angle of 20° to 60°, and particularly preferably at an angle of 30° to 45°. The same preferred angles may apply outside of the sensor housing with regard to the ramp and the main flow direction of the fluid medium.

The ramp may be designed to be flat or also curved. In one first variant, the ramp may be formed entirely by the housing body. In this case, the collar section may be guided completely through the outlet opening, for example, so that the housing body, together with the at least one collar section, may completely form this ramp.

Alternatively, the housing body may, however, be operatively linked to the cover for the formation of the aforementioned ramp. Thus, the collar section may, for example, form a first part of the ramp which then transitions into a second part of the ramp formed by the cover. This transition preferably takes place without gaps, e.g., having a gap of no more than 0.5 mm, in particular no more than 0.3 mm, or even no more than 0.2 mm. Furthermore, a stepless joint may be provided in the area of the ramp, preferably at the transition between the housing body and the cover, for example in that steps are provided having a height of no more than 0.5 mm, preferably no more than 0.3 mm, or even no more than 0.2 mm.

As described above, the collar section may form the edge of the outlet opening entirely or partially. In particular, the collar section may be situated at least on one part of the edge of the outlet opening, which is situated downstream with regard to a main flow direction of the fluid medium outside of the channel.

As described above, the collar section, alone or in operative connection with the cover, may form at least one ramp, in particular. In particular, the collar section engaging with the outlet opening may have a wedge-shaped cross section in a sectional plane perpendicular to an outer side of the cover, e.g., in a sectional plane parallel to the main flow direction of the fluid medium.

As explained above, the collar section engages with the outlet opening in the cover. This engagement may take place partially or entirely, so that the collar section may penetrate the cover partially or entirely. At the outlet opening, the cover may, for example, have a thickness d and the collar section may engage with the cover by at least 20% of this thickness, preferably at least 40% of this thickness, in particular at least 80% of this thickness, and particularly preferably at least 90% or even 100% of the thickness. Alternatively, the collar section may even protrude through the cover and, for example, protrude on the outer side beyond the cover and form a bulge there, for example, or hang over the opening. Different embodiments are possible.

The above-described device has numerous advantages over known devices of the above-mentioned type. In particular, manufacturing and installation tolerances may be compensated for with the aid of the proposed collar section, as described above. In this way, manufacturing and installation requirements and thus also the manufacturing costs may be reduced. Overall, a construction which is robust against installation and manufacturing tolerances and which is still cost-effective may be achieved in this way. Simultaneously, the measurement accuracy of the device may be improved with the aid of the embodiment according to the present invention. Thus a path for the fluid medium, e.g., an air path, may be implemented without jumps in the area of the outlet opening. Simultaneously, tolerances of the transition between the housing body and the cover may be widened, which may result in a more cost-effective tool manufacture, while increasing the measurement accuracy.

DETAILED DESCRIPTION OF THE INVENTION

Figure 1:
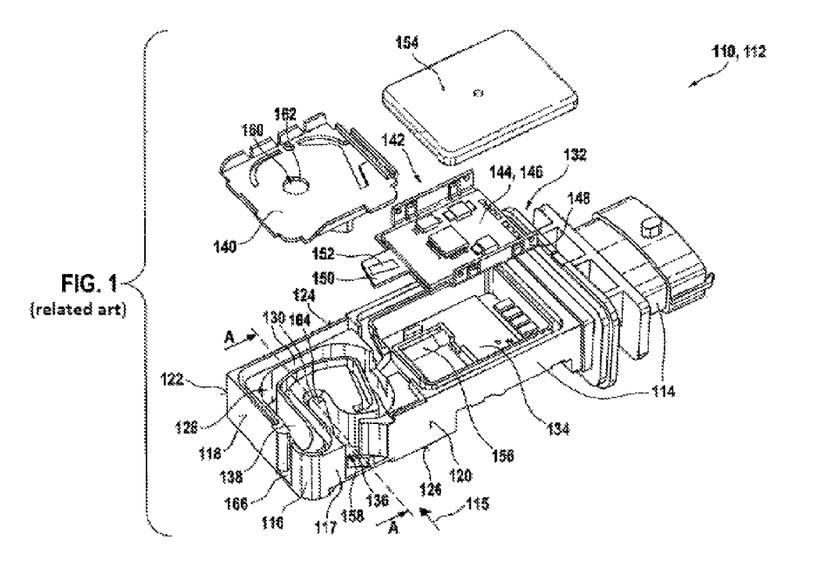
FIG. 1 shows an exploded view of a known hot-film air flow meter.

FIG. 1 shows an exemplary embodiment of a device 110, corresponding to the related art, for detecting at least one property of a fluid medium. In particular, the fluid medium may be a flowing fluid medium, and the property may be a flow property of the fluid medium. The illustration in FIG. 1 shows an exploded view of device 110. Device 110 is designed in this exemplary embodiment as a hot-film air flow meter 112 and includes a plug-in sensor 114, which is introducible into a flow of the fluid medium, e.g., an intake air mass, for example, reversibly or permanently installed in an intake manifold. In FIG. 1, a main flow direction of the fluid medium is identified by reference numeral 115. Hot-film air flow meter 112 corresponds to a commercially available air mass sensor of the type HFM7 from Robert Bosch GmbH, Germany.

Plug-in sensor 114 includes a sensor housing 116 having a head side 118 protruding farthest into the fluid medium, a front side 120 facing main flow direction 115, a back side 122 facing away from main flow direction 115, and two side surfaces 124, 126 which are also referred to in the following as outer sides, side surface 124 being recognizable in FIG. 1. Sensor housing 116 has a housing body 117. In this housing body 117, a channel area 128 having at least one channel 130, through which the fluid medium may flow, and an electronic area 132 having an electronic space 134 incorporated in sensor housing 116 are accommodated. Channel 130 itself has a main channel 136 and a bypass channel 138 which are formed entirely or partially in housing body 117. Channel area 128 is closable on side 124 by a cover 140, e.g., by a channel space cover. Electronic space 134 is designed in this exemplary embodiment as a rectangular indentation in the first side of housing body 117, as an example. In electronic space 134, an electronic module 142 is accommodated which may, for example, include a circuit carrier 144 having an activation and/or analysis circuit 146. Circuit carrier 144 may be situated on a base plate 148, for example. Furthermore, electronic module 142 advantageously includes a sensor carrier 150 in the form of a wing, which may protrude into bypass channel 138 and is extruded onto base plate 148. A sensor element 152 in the form of a hot-film air flow meter chip is incorporated into sensor carrier 150. Electronic space 134 is closable on side 124 by an electronic space cover 154. Furthermore, sensor housing 116 may optionally include on second side 126 a cooling opening 156, which extends into electronic space 134.

As is recognizable in FIG. 1, channel 130 has main channel 136 and bypass channel 138 in the illustrated exemplary embodiment. The main channel extends, for example, from an inlet opening 158, which is accommodated in front side 120, to an outlet opening 160. This outlet opening 160 is situated in cover 140, so that a flow outlet takes place in the illustrated exemplary embodiment from main channel 136 on side surface 124. Outlet opening 160 has an edge 162 which is formed completely by cover 140 in the illustrated exemplary embodiment according to the related art. In housing body 117, a ramp 164 which guides the fluid medium flowing into main channel 136 through inlet opening 158 to outlet opening 160, may be provided in the area of outlet opening 160. Ramp 164 may continue in edge 162 of outlet opening 160, e.g., in that this edge 162 is beveled.

Numerous different embodiments are known of device 110 shown in FIG. 1. Thus, bypass channel 138, for example, ends in a bypass outlet 166 on head side 118 in the exemplary embodiment according to FIG. 1. Embodiments are also possible in which bypass outlet 166 is situated on one of the two side surfaces 124, 126. Furthermore, outlet opening 160 is essentially round in the illustrated exemplary embodiment according to FIG. 1. Other embodiments are also known in principle, however. Thus, outlet opening 160 may, for example, be hole- or slit-shaped. Furthermore, it is to be pointed out that the roles of cover 140 and housing body 117 are basically interchangeable. In the following, cover is referred to that component which forms the outer surface in the area of outlet opening 160, i.e., the side facing the fluid medium outside plug-in sensor 114.

Figure 2:
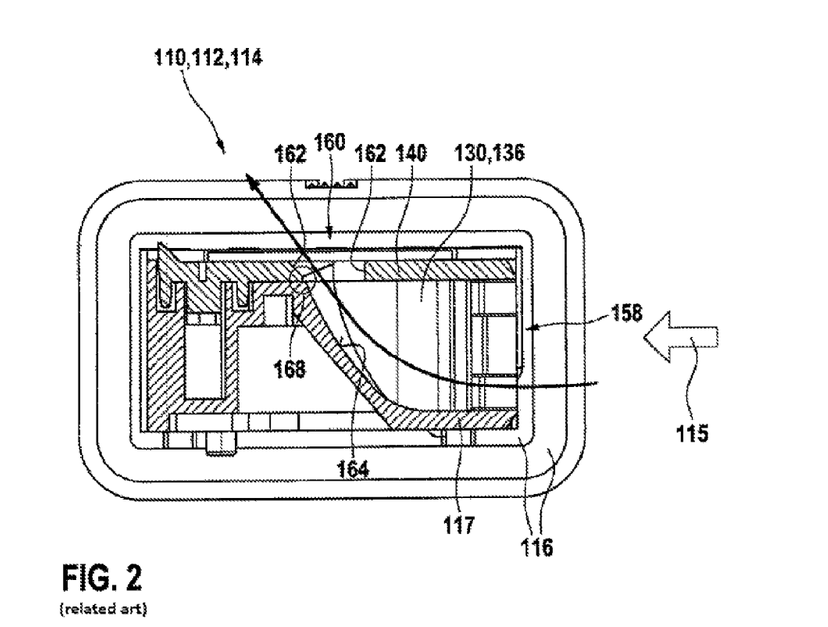
FIG. 2 shows a sectional view of a critical transition at an outlet opening.

According to the related art, the geometries of outlet opening 160 are theoretically ideally matched, i.e., in the case of an ideal installation, there is preferably no overhang, no offset and consequently no step in the path of the air flow in the area of outlet opening 160 at the transition between housing body 117 and cover 140. In FIG. 2, a section along section line A-A in FIG. 1 is shown, in the viewing direction toward head side 118. It is recognizable from this view that a critical area, which is identified by reference numeral 168, results in the area of a transition between housing body 117 and cover 140. This critical area is shown in an enlarged view in FIGS. 3A through 3C for different cases. Here, it is recognizable that in the case of the constructions known from the related art, ramp 164 may continue in cover 140. At the transition between housing body 117 and cover 140, a chamfer 170 may be provided in the area of ramp 164.

Figure 3A:
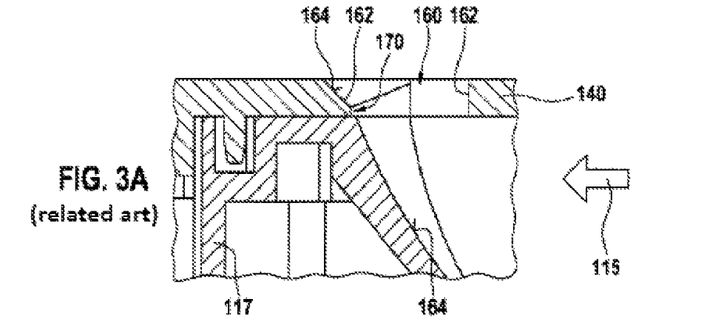
FIGS. 3A through 3C show detailed views of the critical transition according to FIG. 2 in different installations.

In the case of an ideal installation, the offset shown in FIG. 3A may be minimized. Dirt, water, and dust are generally easily discharged through outlet opening 160. Chamfer 170 at the edge of the cover may be omitted, but it is usually provided for improved manufacturability during injection molding.

Figure 3B:
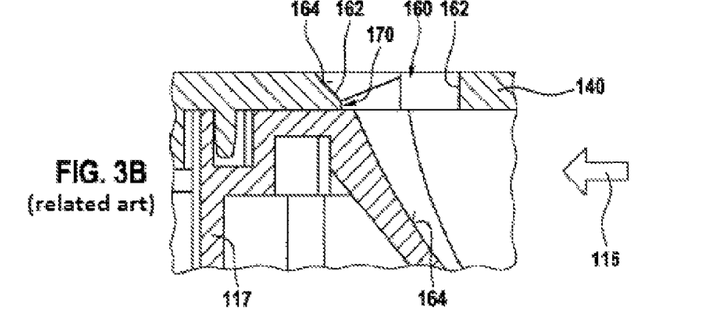
Figure 3C:
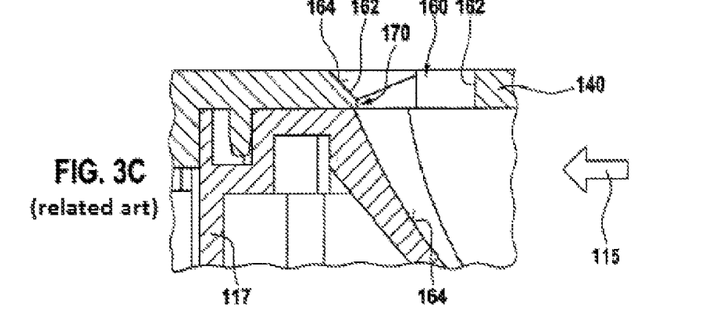

However, an ideal installation is in many cases not possible in large-volume production or possible only with considerable effort. This is mainly due to the fact that cover 140 and/or housing body 117 do not entirely correspond to the designed dimensions. Furthermore, a positioning of cover 140 in relation to housing body 117 generally varies around a mean value. In practice, this also results in cases which are shown in FIGS. 3B and 3C. FIG. 3B, for example, shows a case in which the transition is set back, cover 140 being set back to the outflow side, i.e., to the left in FIG. 3B, together with optional chamfer 170. Ramp 164 therefore has a larger step in the area of this transition than would be the case in an ideal installation. FIG. 3C, in contrast, illustrates a case in which cover 140 is shifted to the inflow side, so that an overhang of cover 140 forms in the area of the ramp. Ramp 164 is interrupted in this area. This variant is particularly disadvantageous for a flow guidance, since additional eddies and a pressure drop may be generated here, which may have an effect on the measurement accuracy.

Figure 4A:
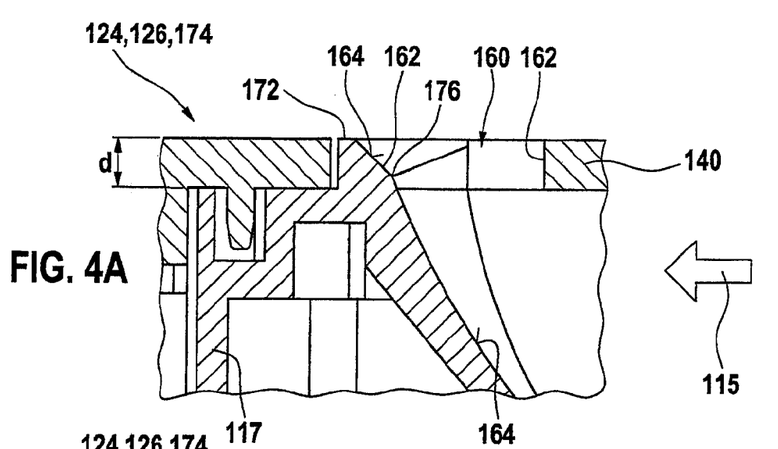
FIGS. 4A through 4C show different exemplary embodiments of a device according to the present invention in a view similar to that of FIGS. 3A through 3C.
Figure 4B:
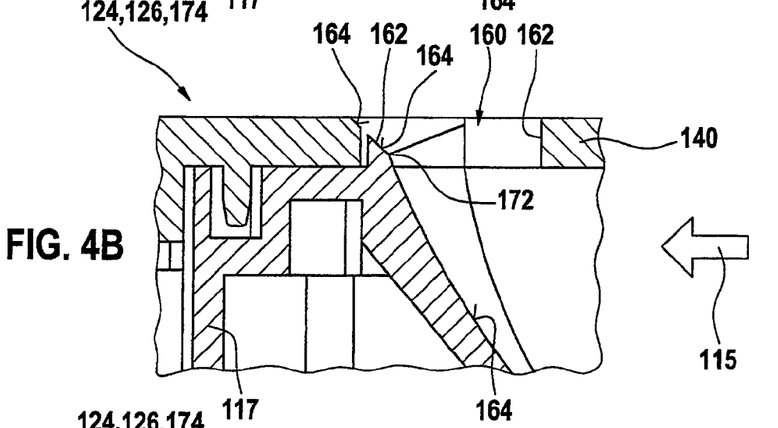
Figure 4C:
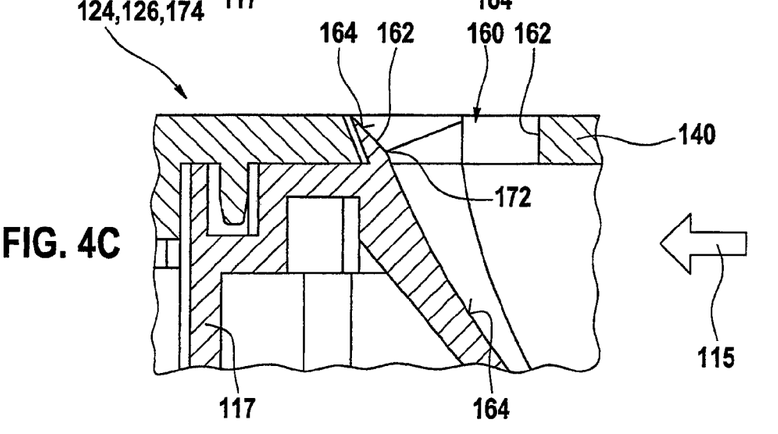

In FIGS. 4A through 4C, embodiments according to the present invention of outlet opening 160 are, in contrast, shown in an enlarged view similarly to that of FIGS. 3A through 3C. These exemplary embodiments according to FIGS. 4A through 4C may be easily integrated even into device 110 according to FIG. 1, for example. All exemplary embodiments have in common that housing body 117 has at least one collar section 172 engaging with outlet opening 116. This collar section 172 may engage entirely or partially with outlet opening 116 or even reach through it. Collar section 172 may, in particular, be situated downstream, as shown in FIGS. 4A through 4C, and form downstream edge 162 of outlet opening 160 or a part thereof.

In particular, ramp 164 may be extended with the aid of collar section 172 in such a way that it penetrates cover 140. In this way, an overhang, as shown in FIG. 3C, for example, cannot develop during the installation.

FIG. 4A shows a preferred specific embodiment in which collar section 162 extends up to an outer side 174, e.g., side surface 124 or 126, e.g., across an entire thickness d of cover 140. Ramp 164 may in this case run at a continuous upward gradient or also, as shown in FIG. 4A through 4C, have one or multiple kinks 176 in the area of outlet opening 116, i.e., a discontinuous upward gradient with regard to main flow direction 115.

As an alternative to the specific embodiment shown in FIG. 4A, FIG. 4B shows a variant in which collar section 172 does not extend completely through outlet opening 160, but in which a part of edge 162 and a part of ramp 164 are formed by cover 140. Although jumps in the air path are possible in this embodiment, they only occur in a variant without overhang which is less harmful flow-dynamically.

Finally, FIG. 4C shows one exemplary embodiment which may essentially correspond to the exemplary embodiment according to FIG. 4A in which, however, collar section 172 runs at an acute angle on its end protruding farthest into opening 160. This acute angle may, for example, terminate flush with outer side 174 or also be set back with regard thereto. Furthermore, cover 140 may also run obliquely to outer side 174 in the area of this collar section 172 and, for example, be adjusted to a contour of collar section 172.

One advantage of the exemplary embodiments shown in FIGS. 4A through 4C and of the basic idea of the present invention is in general that the device producible in this way is robust against installation tolerances between cover 140 and housing body 117. An air path without jumps may be implemented in a simple manner. Furthermore, tolerances of the transition between the cover and housing body 117 may be widened, whereby a more advantageous tool manufacture is implementable. In the variant shown in FIG. 4C, jumps in the air path may moreover be reduced in spite of an optional, only partial guidance of collar section 172 through outlet opening 160, in that an overlap is implemented between cover 140 in this area and collar section 172 viewed perpendicularly onto outer side 174. This embodiment variant, however, generally requires that cover 140 should be mounted not-perpendicularly in a more complex manner.

Figure 5:
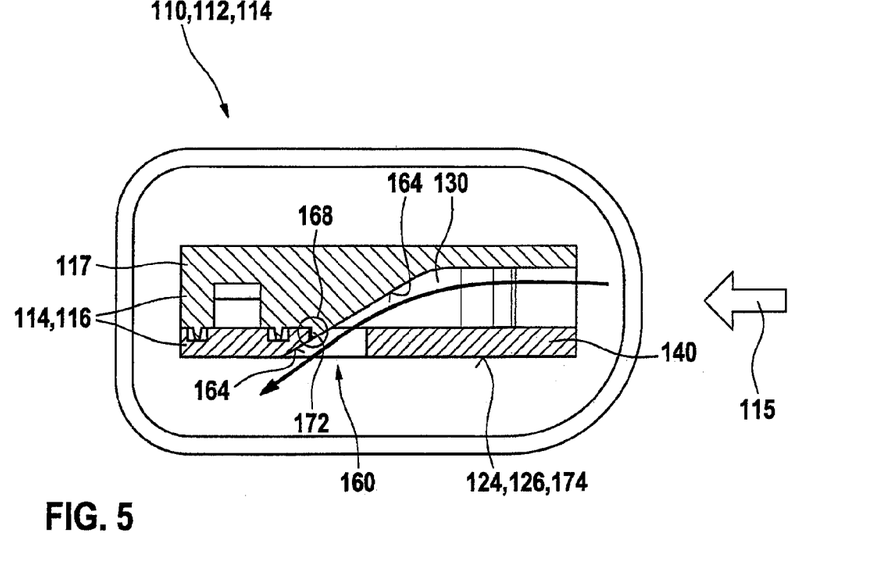
FIG. 5 shows another exemplary embodiment of a device according to the present invention in a view similar to that of FIG. 2.

As described above, the assignment of ramp 164 and outlet opening 160, and the identification of "cover" 140 and "housing body" 117 are selected arbitrarily. In general, the housing part of sensor housing 116, which has outer side 174 toward the fluid medium in the area of outlet opening 160, is identified as cover 140. Housing body 117 is, in contrast, that component of sensor housing 116 which has collar section 172. However, this does not establish in which of these components ramp 164 is situated and in which outlet opening 160 is situated. Thus, it is, for example, possible in contrast to the exemplary embodiment shown in FIGS. 4A through 4C that ramp 164 may basically also be formed in cover 140 and outlet opening 116 may be situated in housing body 117. Such an exemplary embodiment is shown in FIG. 5, in a view which is similar to FIG. 2. In this case, outlet opening 160 is designed in a stationary part of sensor housing 116 which thus forms cover 140 according to the above-mentioned definition even if it is, for example, designed in one piece with the rest of plug-in sensor 114. This cover 140 is illustrated in the bottom area of FIG. 5. The channel structure of channel 130 may, in contrast, be accommodated in a housing part, for example, which is put on top of this stationary part of sensor housing 116 and which functions as housing body 117 in this embodiment, even if it is put on top of the stationary part in the form of a cover. Accordingly, cover 140 is, for example, designed in one piece with plug-in sensor 114 in the exemplary embodiment accordingly to FIG. 5, whereas housing body 117 is, for example, detachable from plug-in sensor 114.

Otherwise, the exemplary embodiment according to FIG. 5 may, for example, correspond to one or more exemplary embodiments in FIGS. 4A through 4C. One exemplary embodiment, which is similar to the exemplary embodiment according to FIG. 4B, is illustrated in which a collar section 172 partially protrudes into outlet opening 160, so that ramp 164 is formed partially from housing body 117 and partially from cover 140 in the area of outlet opening 160. Other embodiments are also possible in principle, however. In any case, ramp 164 may be guided through outlet opening 160.

What is claimed is:

1. A device for detecting at least one property of a fluid medium, comprising:
   at least one sensor housing configured to be introduced into the fluid medium;
   wherein:
      the sensor housing includes:
         (i) at least one channel configured for flow of the fluid medium therethrough;
         (ii) at least one housing body; and
         (iii) at least one cover;
         a bore through the cover forms an outlet opening through which the fluid medium is able to flow out of the at least one channel; and
      the housing body has at least one collar section that extends into the bore so that the collar section forms an edge of the outlet opening, wherein at the outlet opening, the at least one channel has a ramp extending obliquely to the outer side of the at least one cover, and wherein the edge is beveled at an interface with the ramp.

2. The device as recited in claim 1, wherein at least one hot-film, airflow meter sensor element is accommodated in the at least one channel.

3. The device as recited in claim 2, wherein the at least one channel includes at least one main channel and at least one bypass channel branching off of the at least one main channel, and wherein the sensor element is accommodated in the at least one bypass channel.

4. The device as recited in claim 3, wherein the sensor housing is configured at least partially as a plug-in sensor which is introduced into a flow tube containing the fluid medium.

5. The device as recited in claim 3, wherein:
   the at least one cover has an outer side facing the fluid medium; and
   the edge of the outlet opening forms at least one part of the ramp.

6. The device as recited in claim 5, wherein the ramp ends at the outer side at an angle of 30° to 60°.

7. The device as recited in claim 5, wherein the ramp is: (i) formed completely by the housing body; or (ii) formed partially by the housing body and partially by the cover.

8. The device as recited in claim 5, wherein the edge of the outlet opening formed by the collar section is situated at a downstream section of the outlet opening with respect to a main flow direction of the fluid medium.

9. The device as recited in claim 8, wherein the collar section has a wedge-shaped cross section in a sectional plane perpendicular to an outer side of the cover.

10. The device as recited in claim 8, wherein the collar section extends into the cover by at least 20% of a thickness of the cover at the outlet opening.

* * * * *